Patented Apr. 28, 1931

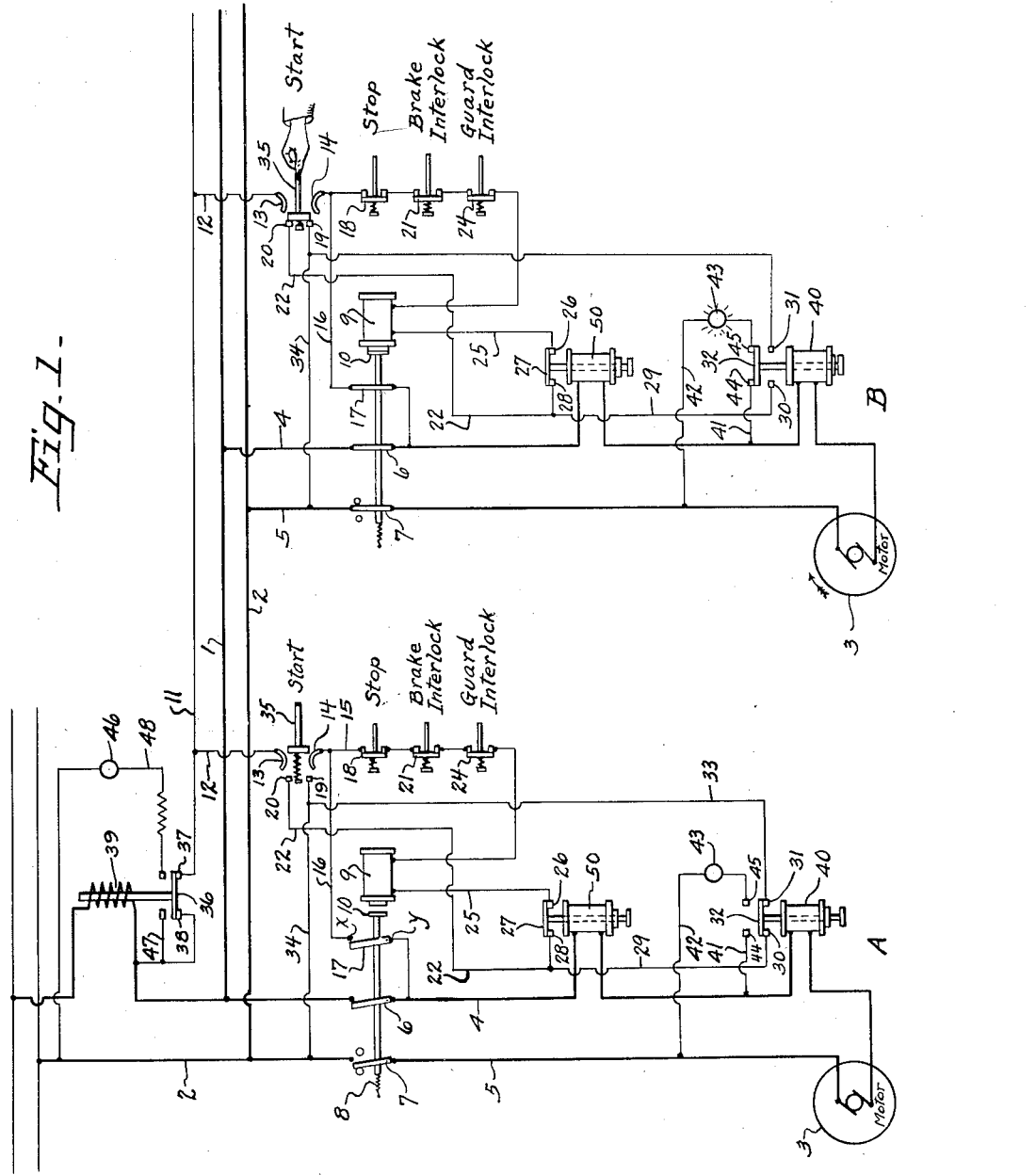

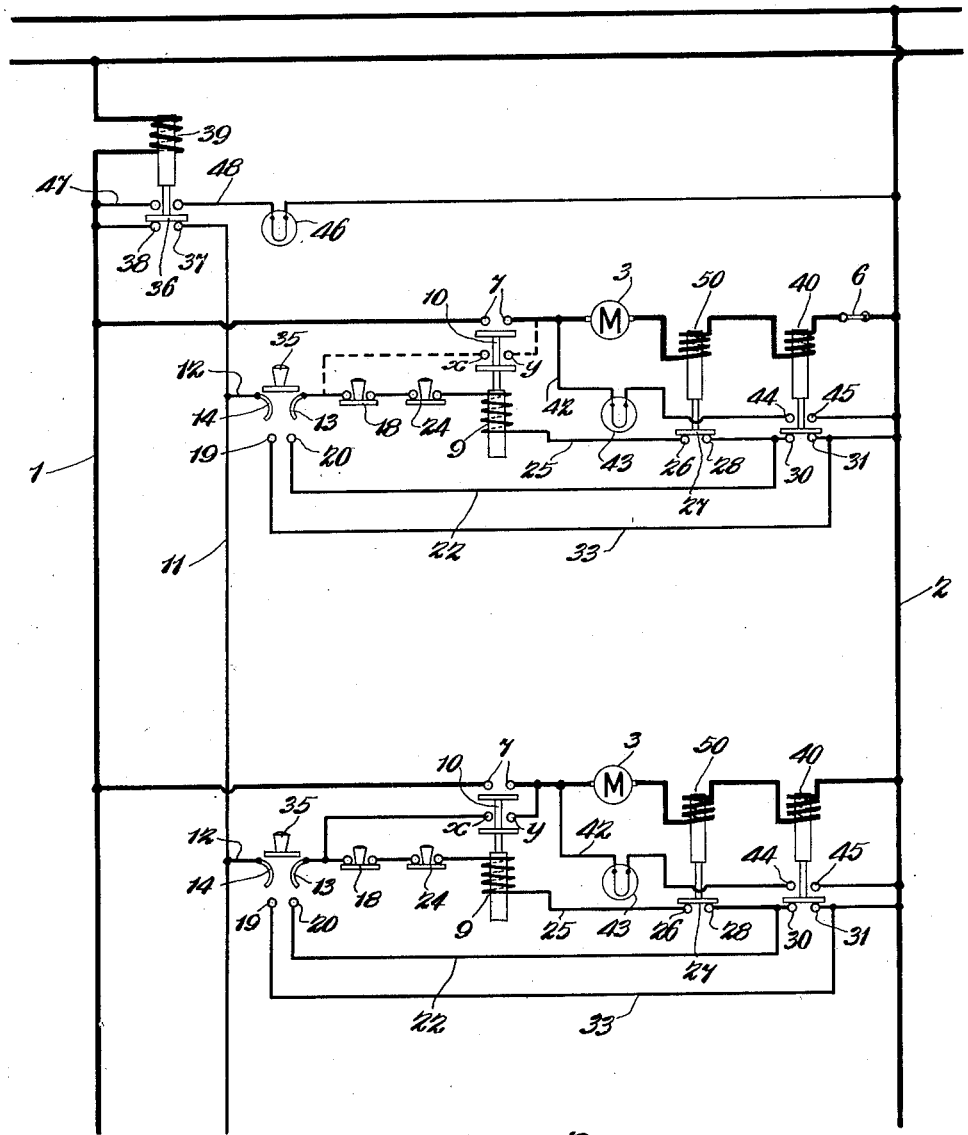

1,802,751

UNITED STATES PATENT OFFICE

TANDY A. BRYSON, OF TROY, NEW YORK, ASSIGNOR TO TOLHURST MACHINE WORKS, INC., OF TROY, NEW YORK, A CORPORATION OF NEW YORK

ELECTRIC POWER-DISTRIBUTING SYSTEM

Original application filed June 17, 1924, Serial No. 720,490. Divided and this application filed November 3, 1927. Serial No. 230,836.

The invention relates to systems for the distribution and control of electric power, and more particularly to a novel system and mechanism for controlling the load thrown on an electric feeder circuit having a plurality of branch circuits and for controlling the load drawn by each branch circuit.

This application is a division of my copending application Ser. No. 720,490, filed June 17, 1924, Patent No. 1,743,754.

Certain features of the invention are directed to providing a system of electric power distribution whereby the amount of current supplied from a common source to a plurality of power consuming mechanism, such, for example, as a battery of electric motors connected by branch circuits to a common feeder circuit, can be controlled so as to regulate the load thrown upon the feeder circuit at any particular time. These features of the invention have for their object the preventing of overloading the feeder circuit by the substantially simultaneous starting of two or more motors connected to the feeder circuit by respective branch circuits. In accomplishing this object, the invention provides distributing mechanism which automatically insures that no additional motor of the battery can draw the heavy amperage required for starting until the total current drawn by the motors already in circuit has dropped below a predetermined quantity. The invention further provides that the operation of the mechanism controlling the starting of additional motors in no way affects the operation of the motors already started and running.

Certain other features of the invention are directed to providing a system of control for an electric power circuit, such, for example, as a branch circuit for starting and supplying an electric motor. These features of the invention have for their object the provision of a system for controlling the amount of current supplied to the power circuit for starting the motor and for further controlling the amount of current supplied after the motor has attained running speed. The control system not only automatically prevents the application of excess current to the branch circuit during the starting of the motor, but once the motor has attained running speed, insures that an amount of current in excess of the comparatively small running amperage cannot pass through the power circuit, the latter safeguard being automatically rendered effective as soon as the motor reaches running speed.

The invention is further directed to a novel and highly useful combination of the above outlined systems of power distribution and control, whereby the operation of the control mechanism for a single motor is rendered dependent upon and is controlled by the operation of the power distributing system, so that no motor can be started while the current in a common feeder circuit exceeds a predetermined quantity; but as soon as the current in the feeder circuit drops to the predetermined point, the branch motor control system is rendered effective.

The customary electric circuit arrangement for a battery of motors, such, for example, as those used for driving a battery of centrifugal machines, comprises a main feeder circuit which provides power for a plurality of branch motor feeding circuits. As is well known, the amount of current necesary to start an electric motor, particularly one which is being used to drive a load of great inertia such as a centrifugal extractor, is very much greater than the amount required to keep the motor and its load at running speed, once the starting inertia has been overcome. However, the high starting amperage is required for a comparatively short time in the run of the machine. Considered solely for the sake of example, it being understood that the broad principles of the invention are in no way limited thereby, it may be stated that the motor for a common size of centrifugal extractor draws 60 amperes (at 220 volts) for one minute during the starting period and 12 amperes thereafter so long as the machine is kept running. When several motors are connected by branch circuits to a feeder, the loads on the feeder from the various branches are cumulative. Considering further the example outlined above, in an installation of five machines the feeder load may be 300 amperes if all the motors are started at once. But if, before starting any one motor, the previously started motors are allowed to come up to running speed, the maximum load thrown upon the feeder circuit at any time will be the sum of the running loads for the previously started motors plus the starting load for the newly started motor; in the example given this maximum would total 108 amperes, that is, four motors running at 12 amperes or 48 amperes plus one motor starting at 60 amperes.

The features of my invention primarily referred to provide a control system which prevents the addition to a feeder circuit of more than a predetermined load, whereas the circuit breaker or fuse acts only after the excess load has been applied. The control system of my invention moreover, operates without disturbing branch circuits and motors already closed and in operation.

It will be understood that the foregoing general description, and the following detailed description as well, are exemplary and explanatory of the invention, but are not restrictive thereof.

Of the drawings:—

Fig. 1 diagrammatically illustrates one embodiment of the invention, and

Fig. 2 is a simplified showing of the embodiment shown in Fig. 1.

These figures, together with the description thereof, serve to explain the principles of the present invention.

Referring now in detail to the embodiment of the invention illustrated by way of example in the accompanying drawing, a general feeder circuit comprising wires 1 and 2 is provided with a plurality of branch circuits A, B etc. for supplying current to respective motors 3—3, having circuit wires 4 and 5 connecting with the feeder circuit switches 6 and 7, respectively which are normally held in open circuit position by suitable means such as spring 8.

Means are provided for closing and holding in closed circuit position the switches 6 and 7, comprising as embodied an electro-magnet 9 which, when suitably energized attracts an armature 10 to close the switches. A circuit for energizing the electro-magnet is provided with a connection to the feeder circuit above or outside the main switches 6 and 7. As embodied, lead wire 11 has one terminal connected to the feeder wire 1 and has leads 12, 12 for supplying current to energizing circuits A, B respectively, for their electro-magnets 9, 9 the connections 12, 12 being provided with brush or spring contact terminals 13. A corresponding brush 14 connects to the wire 15 of the energizing circuit, which has a "stop" switch 18, a "brake interlock" 21, and a "guard interlock," 24 in series with the coil of the electro-magnet 9. It will be understood that the stop switch, brake interlock and guard interlock would be employed when the control system is applied to a centrifugal machine and are shown for purposes of illustration only, since they form no necessary part of the present invention.

From the coil of the electro-magnet 9 the wire 25 connects with terminal 26 of the electro-magnetic switch 27 which serves to conduct the current of the energizing circuit through terminal 28 to wire 29 whence the current returns to the wire 2 of the feeder circuit via electro-magnetic switch 32 bridging gap 30—31, wire 33 and connecting return wire 34 which joins wire 2 above the main switch 7.

Means are provided for momentarily energizing the electro-magnet 9 to close the main switches 6 and 7. As embodied, manually operated switch 35 touches brushes 13 and 14 to momentarily connect wire 15 with lead 12. When this is done, current flows through wire 11, lead 12, wire 15, the coil of magnet 9, wire 25, through switch 26, wire 29, switch 32, and wires 33 and 34 to complete the energizing circuit and thereby close the main switches 6 and 7. For maintaining the energization of electro-magnet 9 after the gap 13—14 is reopened, the energizing circuit is provided with a lead wire 16 in shunt relation with gap 13—14, tapping the branch circuit wire 4 and connecting with wire 15. A switch 17 controlled by electro-magnet 9 bridges a gap X—Y in wire 16 and forms the connecting link with branch circuit wire 4. Hand switch 35, when pushed beyond the brushes 13—14, connects terminal 19 of return wire 34 to terminal 20 of wire 22, which leads to terminal 28 of electro-magnetic switch 27, thereby shunting gap 13—14 and gap 30—31 of switch 32.

When switch 35 closes gap 19—20, the energizing current flows from branch circuit wire 4 along 16, switch 17, wire 15, through the coil of magnet 9, wire 25, switch 27, wire 22, switch 35, and back along wire 34. Since the closing of gap 19—20 takes place instantaneously after gap 13—14 is reopened, due to the inward movement of hand-switch 35, the magnet 9 remains energized as long as gap 19—20 is closed by switch 35.

Referring now to electro-magnetic switch 32, it will be seen that this switch is controlled by a relay 40 in the branch circuit wire 4. In carrying out one feature of the invention, relay 40 is set to trip switch 32 when the current in the branch circuit exceeds a quantity necessary for keeping the motor at running speed; in the previously stated example a quantity of 12 amperes. Therefore, when the branch circuit is first closed and the load of the inert motor is thrown upon it, causing a heavy current to pass through the branch circuit, the relay 40 is almost immediately tripped and gap 30—31 opened. Hence while the motor is drawing starting currents, switch 32 is shunted out of the magnet energizing circuit and all the current in the energizing circuit returns from terminal 28 via 22, 20—19, and 34 to feeder 2.

Signalling means are provided for apprising the operator of the position of switch 32. As embodied circuit 41, 42 in parallel with the branch circuit is connected with a lamp 43. A gap 44—45 in circuit 41—42 is normally open and is adapted to be closed by a switch 32 when relay 40 is tripped to open gap 30—31. Therefore, when gap 30—31 is open the lamp 43 is lighted and the operator knows that the current in the branch circuit is in excess of that necessary to keep the motor at running speed, or in other words, that the motor has not yet come to speed. As soon as the motor comes to speed, the load on the branch circuit drops below the setting for relay 40, which in the stated example would be 12 amperes, the switch 32 falls to close gap 30—31 and lamp 43 is extinguished. The current for the energizing circuit can then come through the line 29, 30—31, 33 to return 34 and thence to feeder 2, making the closure of gap 20—29 no longer necessary. The operator can then release switch 35 opening 20—19 and shunting wire 22.

Referring now to the means provided by the invention for regulating the load thrown upon the feeder circuit, a gap 37—38 in lead 11 is opened and closed by an electro-magnetic switch 36. The opening and closing of switch 36 is controlled by a relay 39 in the feeder circuit, this relay being set to open gap 37—38 when the current in the feeder circuit exceeds a predetermined quantity, thereby rendering the closing of gap 13—14 of any of the branch circuits A, B etc. ineffective to initially close the electro-magnet energizing circuit.

According to the invention, relay 39 would be set to trip at a current slightly below the amount necessary to start the motor of any branch circuit, a setting of about 55 amperes being proper in the specific example mentioned. When branch circuit A is first closed and the motor is drawing starting current of 60 amperes, the relay 39 will trip, thereby making ineffective the momentary closing of gap 13—14. So long as branch circuit A draws current in excess of 55 amperes, it will therefore be impossible for an operator to start any additional motor, since no current passes through wire 11. When the current in branch circuit A and consequently the load on the feeder circuit drop to 55 amperes, switch 36 again closes gap 37—38 thereby rendering the closing of gap 13—14 of branch circuit B effective to initially close its electro-magnet energizing circuit. The resultant closing of circuit B throws a load of 60 additional amperes onto the feeder circuit and the switch 36 immediately reopens, thereby preventing a closing of any subsequent branch circuits until the total current drawn by branch circuits A and B together drops to 55 amperes. Hence relay 39 and switch 36 insure that the load on the feeder circuit can never be greater than 115 amperes.

Signaling means for informing the operator of the position of switch 36 are provided comprising a lamp circuit 47, 48 in shunt relation with gap 37—38 and having a lamp 46. The opening of gap 37—38 by relay 39 effects the closing of circuit 44—45 by switch 36 to illuminate lamp 46. An operator attempting to close a branch circuit by means of its gap 13—14 will be informed by the light 46 that his motor will not start because switch 36 is still open.

It will be further apparent that the opening and closing of gap 37—38 does not affect branch circuits previously closed. The current supplied by lead 11 is used only for the momentary, initial energization of magnet 9, since gap 13—14 is immediately shunted by switch 35 and gap 19—20 so that the maintaining current for the magnet is drawn from branch circuit wire 4 as already explained. Branch circuits already closed are therefore independent of lead wire 11 and the opening and closing of gap 37—38 does not disturb their operation.

Referring now once more to the control system for a single branch circuit, means are provided according to the invention for preventing a load on a branch circuit in excess of the starting current. It will be noted that electro-magnetic switch 27 is in series with the coil of electro-magnet 9 and is therefore continuously in the energizing circuit. A relay 50 in the branch circuit wire 4 controls switch 27 and is set to throw switch 27 when the current exceeds the starting amount; in the example, a current in excess of 60 amperes. The branch circuit is therefore protected from an over-load while the motor is starting and before the relay 40 is in operation.

Recapitulating briefly the operation of the branch control system, for branch circuit A, the operator pushes in manual switch 35 to momentarily close gap 13—14, sending current along 15 through the coil of magnet 9, thence through switches 27 and 32 and back to the feeder circuit along 33 and 34. This momentary closing closes switches 6, 7 and 17. Immediately thereafter switch 35 breaks gap 13—14 and closes gap 19—20, shunting gap 13—14, and gap 30—31, the current now following the path 16, 17, 15, 25, 27, 22, 20—19, and 34 during the time that switch 35 is held in its innermost position and the motor is coming to speed. When the motor comes to speed, switch 32 recloses, and the operator, apprised by the extinction of lamp 43, releases switch 35 thereby shunting wire 22. The energizing circuit is now maintained through 16, 17, 15, 9, 25, 27, 29, 30—31, 33 and 34. This status remains so long as the branch circuit current does not exceed 12 amperes, in which event relay 40 trips to break gap 30—31.

The invention in its broader aspects is not limited to the specific mechanisms shown and described but departures may be made therefrom within the scope of the accompanying claims without departing from the principles of the invention and without sacrificing its chief advantages.

What I claim is:—

1. A system for distributing electric power including in combination a plurality of branch circuits, a common feeder circuit for the branch circuits, and means controlled by the current in the feeder circuit for preventing closure of a branch circuit when the current in the feeder circuit exceeds a predetermined quantity while permitting branch circuits already closed to remain closed.

2. A system for distributing electric power including in combination a plurality of branch circuits, a common feeder circuit for the branch circuits, means for successively closing the respective branch circuits, means for maintaining the closure of the closed branch circuits, and means controlled by the current in the feeder circuit for preventing the closure of the additional branch circuits remaining open when the feeder circuit current exceeds a predetermined quantity while permitting the already closed branch circuits to remain closed.

3. A system for distributing electric power including in combination a plurality of branch circuits, a common feeder circuit for the branch circuits, means for successively closing the respective branch circuits, means for maintaining the closure of the closed branch circuits, and means controlled by the current in the feeder circuit for preventing the closure of the additional branch circuits remaining open when the feeder circuit current exceeds a predetermined quantity while permitting the already closed branch circuits to remain closed and permitting the successive closure of the additional branch circuits when the feeder circuit current thereafter falls to the predetermined quantity.

4. A system for distributing electric power including in combination a feeder circuit, a branch circuit, means controlled by the current in the feeder circuit for preventing closure of the branch circuit when the feeder circuit current exceeds a predetermined quantity and means controlled by the branch circuit current for opening the branch circuit when the current therein exceeds a second lower predetermined quantity.

5. A system for distributing electric power including in combination a plurality of branch circuits, a common feeder circuit for the branch circuits, means for preventing closure of a branch circuit when the current in the feeder circuit exceeds a predetermined quantity in order to prevent overloading the feeder circuit and means associated with each branch circuit for opening the respective branch circuit when the respective branch circuit current exceeds a lower predetermined quantity.

In testimony whereof, I have signed my name to this specification.

TANDY A. BRYSON.